United States Patent
Sato

(10) Patent No.: US 9,825,490 B2
(45) Date of Patent: Nov. 21, 2017

(54) POWER TRANSMISSION DEVICE, POWER TRANSMISSION METHOD, POWER RECEPTION DEVICE, POWER RECEPTION METHOD, AND POWER TRANSMISSION SYSTEM

(75) Inventor: Kazuhiro Sato, Tokyo (JP)

(73) Assignee: Sony Corporation, Tokyo (JP)

(*) Notice: Subject to any disclaimer, the term of this patent is extended or adjusted under 35 U.S.C. 154(b) by 1164 days.

(21) Appl. No.: 12/755,005

(22) Filed: Apr. 6, 2010

(65) Prior Publication Data

US 2010/0259109 A1 Oct. 14, 2010

(30) Foreign Application Priority Data

Apr. 14, 2009 (JP) ................. 2009-097661

(51) Int. Cl.
| | | |
|---|---|---|
| H01F 27/42 | (2006.01) | |
| H01F 37/00 | (2006.01) | |
| H01F 38/00 | (2006.01) | |
| H02J 17/00 | (2006.01) | |
| H02J 7/02 | (2016.01) | |

(52) U.S. Cl.
CPC .............. *H02J 17/00* (2013.01); *H02J 7/025* (2013.01)

(58) Field of Classification Search
CPC ......... H02J 7/025; H02J 17/00; H02J 17/005; H02J 50/00; H02J 50/12; H02F 38/14
USPC .......................................... 307/104; 320/108
See application file for complete search history.

(56) References Cited

U.S. PATENT DOCUMENTS

| | | |
|---|---|---|
| 4,234,952 A | 11/1980 | Gable et al. |
| 5,568,469 A | 10/1996 | Sherer et al. |
| 5,974,312 A | 10/1999 | Hayes et al. |
| 5,991,308 A | 11/1999 | Fuhrmann et al. |
| 7,917,251 B2 | 3/2011 | Kressner et al. |
| 8,553,743 B1 | 10/2013 | Nichols et al. |
| 8,869,213 B2 | 10/2014 | Imai et al. |
| 9,479,722 B2 | 10/2016 | Tsukahara et al. |
| 9,484,972 B2 | 11/2016 | Nakajima et al. |
| 2003/0006880 A1* | 1/2003 | Zimmer ................. 340/10.34 |
| 2003/0231074 A1* | 12/2003 | Fujidai et al. .......... 331/177 V |
| 2007/0085487 A1* | 4/2007 | Kuennen ............... A61L 2/10 315/209 R |
| 2008/0188712 A1* | 8/2008 | Shimizu ............ A61B 1/00016 600/118 |
| 2008/0197802 A1* | 8/2008 | Onishi ................... H02J 5/005 320/106 |
| 2008/0238364 A1* | 10/2008 | Weber et al. ............ 320/108 |
| 2009/0224856 A1* | 9/2009 | Karalis et al. ........... 333/219.2 |

(Continued)

FOREIGN PATENT DOCUMENTS

| | | |
|---|---|---|
| JP | 2008-295191 A | 12/2008 |
| JP | 2009106136 A * | 5/2009 |

*Primary Examiner* — Rexford Barnie
*Assistant Examiner* — Rasem Mourad
(74) *Attorney, Agent, or Firm* — Wolf, Greenfield & Sacks, P.C.

(57) ABSTRACT

A power transmission device includes: a transmission means including at least an oscillation means and a resonant means and for transmitting power to a power reception device by using a magnetic resonance-type power transmission technique; and a control means for controlling the reception power of the power reception device so as to be at a maximum by changing at least one of an oscillation frequency of the oscillation means and a resonant frequency of the resonant means.

6 Claims, 10 Drawing Sheets

(56) References Cited

U.S. PATENT DOCUMENTS

| | | |
|---|---|---|
| 2010/0041333 A1 | 2/2010 | Ungari et al. |
| 2010/0141042 A1* | 6/2010 | Kesler ................. B60L 11/007 307/104 |
| 2010/0262846 A1 | 10/2010 | Sato |
| 2011/0247041 A1 | 10/2011 | Imai et al. |
| 2012/0113324 A1 | 5/2012 | Yoshida et al. |
| 2015/0319395 A1 | 11/2015 | Tsukahara et al. |
| 2015/0372704 A1 | 12/2015 | Nakajima et al. |
| 2015/0382049 A1 | 12/2015 | Fujii et al. |
| 2016/0028422 A1 | 1/2016 | Shimizu et al. |
| 2016/0142664 A1 | 5/2016 | Takiguchi et al. |

* cited by examiner

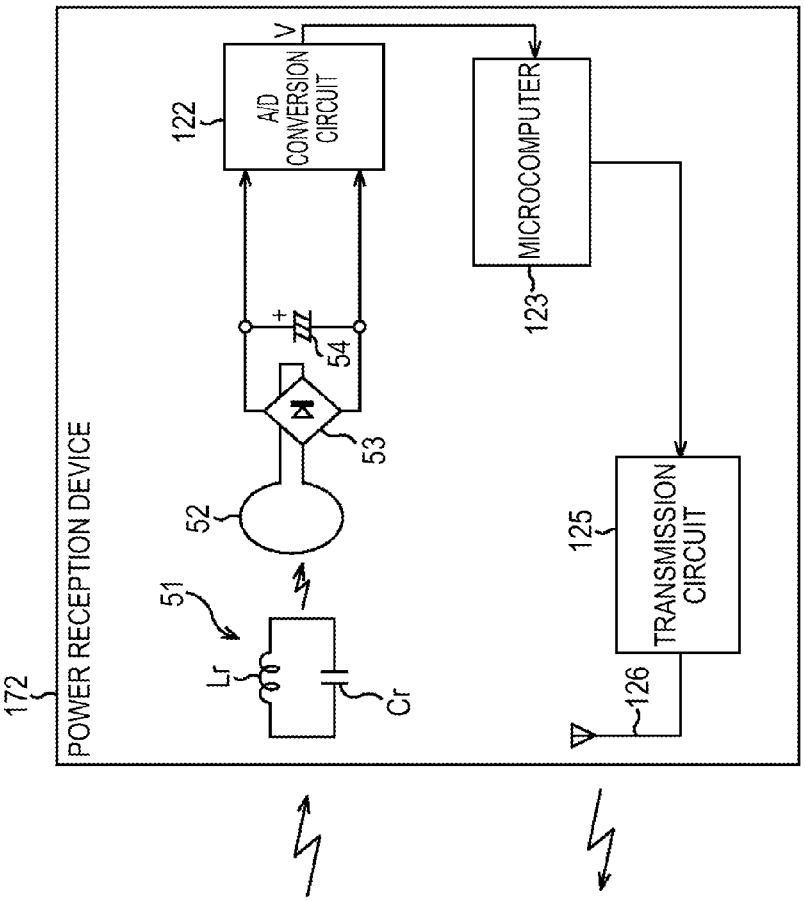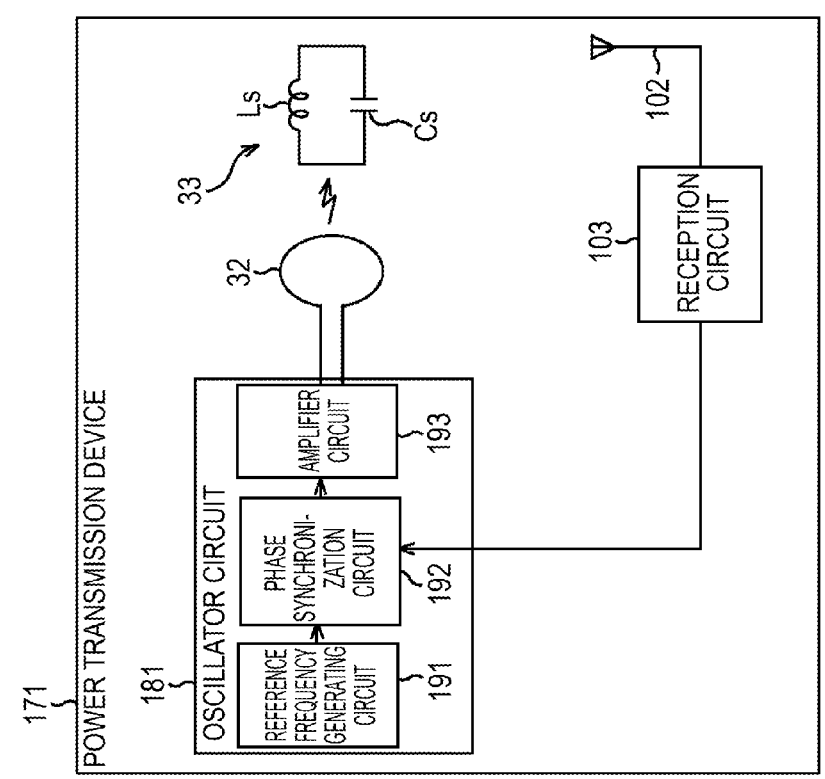
FIG.6

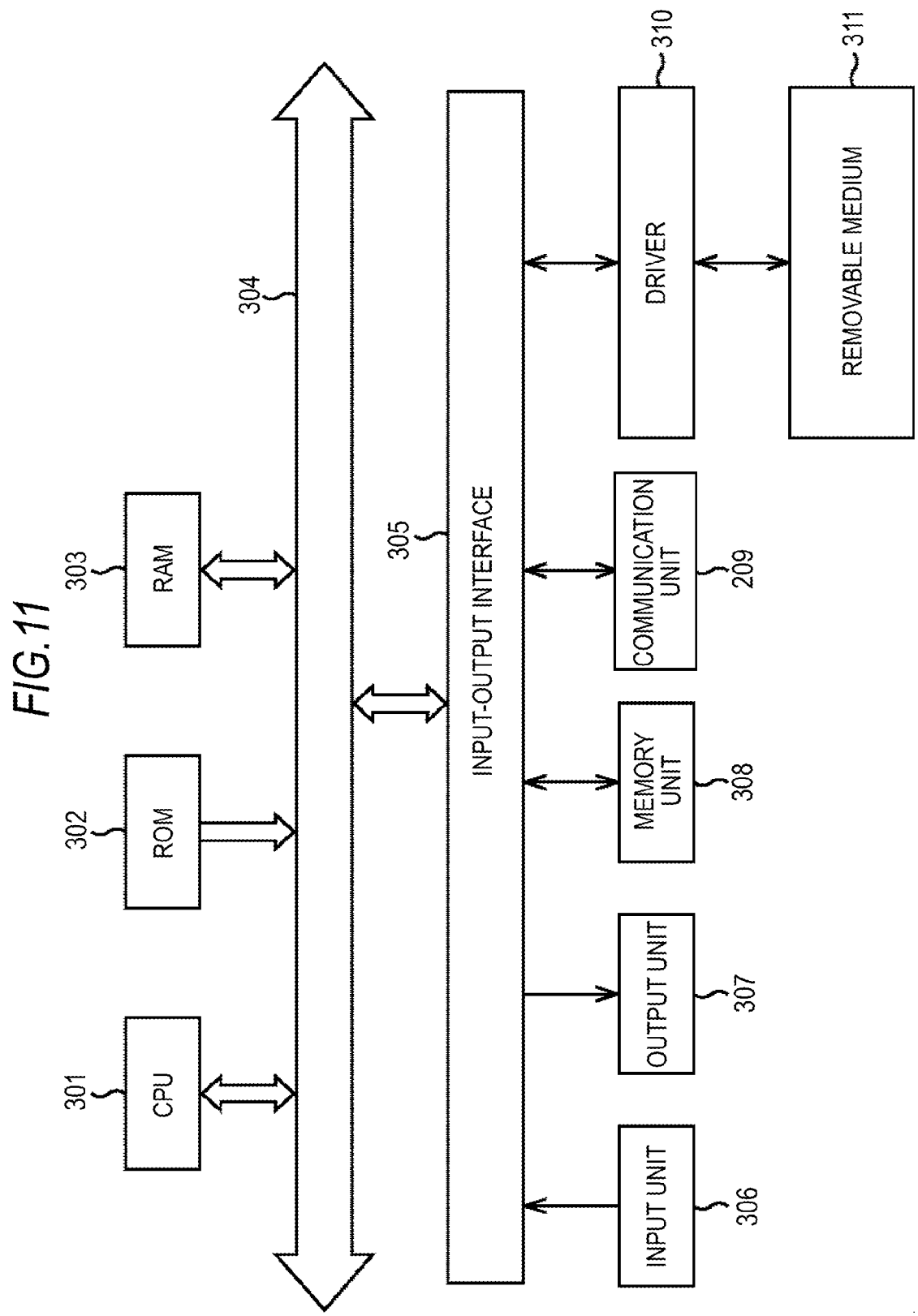

POWER TRANSMISSION DEVICE, POWER TRANSMISSION METHOD, POWER RECEPTION DEVICE, POWER RECEPTION METHOD, AND POWER TRANSMISSION SYSTEM

BACKGROUND OF THE INVENTION

1. Field of the Invention

The present invention relates to a power transmission device, a power transmission method, a power reception device, a power reception method, and a power transmission system, and more particularly, to a power transmission device, a power transmission method, a power reception device, a power reception method, and a power transmission system that are capable of stably transmitting the power in a non-contacting manner.

2. Description of the Related Art

Recently, systems that transmit power in a non-contacting manner are researched and developed (for example, see JP-A-2008-295191). Hereinafter, such systems will be referred to as non-contacting power transmission systems.

As a power transmission technique for such non-contacting power transmission systems, for example, there is an electromagnetic induction-type power transmission technique. In addition, as a power transmission technique, there is a magnetic resonance-type power transmission technique recently developed by the Soljacic professor group of MIT (Massachusetts Institute of Technology). The magnetic resonance-type power transmission technique has the characteristic that long-distance transmission can be performed, compared to the electromagnetic induction-type power transmission technique.

SUMMARY OF THE INVENTION

However, in a case where a general magnetic resonance-type power transmission technique is used, when metal, a person, or the like is disposed close to the periphery of a coil, for example the periphery of a power transmission coil, a resonant coil, a power reception coil, or the like, that is a constituent element of the non-contacting power transmission system, a change in the resonant frequency may occur. In a case where a general magnetic resonance-type transmission technique is used, particularly, the Q value of the resonant coil is very high. Accordingly, the transmission efficiency decreases due to a slight frequency change in the resonant frequency.

As described above, according to the general magnetic resonance-type power transmission technique, it is difficult to transmit the power in a stable manner.

Thus, it is desirable to stably transmit the power in a non-contacting manner.

One embodiment of the present invention is directed to a power transmission device including: a transmission means including at least an oscillation means and a resonant means and for transmitting power to a power reception device by using a magnetic resonance-type power transmission technique; and a control means for controlling reception power of the power reception device so as to be at a maximum by changing at least one of an oscillation frequency of the oscillation means and a resonant frequency of the resonant means.

In a case where a change command for changing at least one of the oscillation frequency and the resonant frequency is generated and transmitted by the power reception device based on the reception power, the control means may receive the change command and perform control for changing at least one of the oscillation frequency and the resonant frequency in accordance with the change command.

The power transimssion device may be configured such that the resonant means is able to change the resonant frequency, the change command is a command for changing the resonant frequency, and the control means changes the resonant frequency in accordance with the change command.

The power transimssion device may be configured such that the resonant means has a variable capacitance diode, and the control means changes the resonant frequency by changing the voltage applied to the variable capacitance diode.

The power transmission device may be configured such that the oscillation means is able to change the oscillation frequency, the change command is a command for changing the oscillation frequency, and the control means changes the oscillation frequency in accordance with the change command.

One embodiment of the present invention is also directed to a power transmission method corresponding to the above-described power transmission device.

One embodiment of the present invention is also directed to a power reception device including: a power reception means for receiving power by using at least a reception-side resonant means in a case where the power is transmitted from a power transmission device that includes at least an oscillation means and a transmission-side resonant means and transmits the power by using a magnetic resonance-type power transmission technique; and a control means for controlling reception power of the power reception device so as to be at a maximum by changing at least one of an oscillation frequency of the oscillation means, a transmission-side resonant frequency of the transmission-side resonant means, and a reception-side resonant frequency of the reception-side resonant means.

The power reception device may be configured such that the reception-side resonant means is able to change the reception-side resonant frequency, and the control means measures the reception power and changes the reception-side resonant frequency based on the measured value of the reception power.

The power reception device may be configured such that the reception-side resonant means has a variable capacitance diode, and the control means changes the reception-side resonant frequency by changing the voltage applied to the variable capacitance diode.

The power reception device may be configured such that the transmission-side resonant means of the transmission device is able to change the transmission-side resonant frequency, and the control means performs control for generating a change command for changing the transmission-side resonant frequency based on the measured value of the reception power and transmitting the generated change command to the power transmission device.

The power reception device may be configured such that the oscillation means of the power transmission device is able to change the oscillation frequency, and the control means performs control for generating a change command for changing the oscillation frequency based on the measured value of the reception power and transmitting the generated change command to the power transmission device.

One embodiment of the present invention also directed to a power reception method corresponding to the above-described power reception device.

Another embodiment of the present invention is directed to a power transmission system including: a power transmission device that includes at least an oscillation means and a transmission-side resonant means and transmits power by using a magnetic resonance-type power transmission technique; and a power reception device that receives the power transmitted from the power transmission device at least by using a reception-side resonant means. Here, reception power of the power reception device is controlled to be at a maximum by changing at least one of an oscillation frequency of the oscillation means, a transmission-side resonant frequency of the transmission-side resonant means, and a reception-side resonant frequency of the reception-side resonant means.

Another embodiment of the present invention is also directed to a power transmission device including: a power transmission means for transmitting power to a power reception device by using a magnetic resonance-type power transmission technique; and a control means for controlling reception power of the power reception device by changing the transmission power of the power transmission means.

Another embodiment of the present invention is also directed to a method corresponding to the above-described power transmission device.

Another embodiment of the present invention is also directed a power reception device including: a power reception means for receiving power in a case where the power is transmitted from a power transmission device that transmits the power by using a magnetic resonance-type power transmission technique; and a control means for controlling reception power of the power reception device by changing the transmission power of the transmission device.

Another embodiment of the present invention is also directed to a power reception method corresponding to the above-described power reception device.

Another embodiment of the present invention is also directed to a power transmission system including: a power transmission device that transmits power by using a magnetic resonance-type power transmission technique; and a power reception device that receives the power transmitted from the power transmission device. Here, reception power of the power reception device is controlled by changing the transmission power of the power transmission device.

According to one embodiment of the present invention, the following process is performed by the power transmission device that transmits power by using at least the oscillation means and the transmission-side resonant means in accordance with a magnetic resonance-type power transmission technique and the power reception device that receives the power transmitted from the power transmission device at least by using the reception-side resonant means. The reception power of the power reception device is controlled to be at a maximum by changing at least one of an oscillation frequency of the oscillation means, a transmission-side resonant frequency of the transmission-side resonant means, and a reception-side resonant frequency of the reception-side resonant means.

According to another embodiment of the present invention, the following process is performed by the power transmission device that transmits power by using a magnetic resonance-type power transmission technique and the power reception device that receives the power transmitted from the power transmission device. The reception power of the power reception device is controlled by changing the transmission power of the power transmission device.

According to the embodiments of the present invention, the power can be transmitted in a stable manner.

BRIEF DESCRIPTION OF THE DRAWINGS

FIG. 6 is a block diagram representing a configuration example of a power transmission system according to a second embodiment of the present invention.

FIG. 11 is a block diagram representing a configuration example of the hardware of a computer according to an embodiment of the present invention.

DETAILED DESCRIPTION OF THE INVENTION

First, for easy understanding of the present invention and clarifying the background, a magnetic resonance-type power transmission technique will be described as a base. Next, as embodiments of power transmission systems to which the present invention is applied, three embodiments (hereinafter, referred to as first to third embodiments) will be described. Thus, the description will be made in the following order.
1. Basic Power Transmission Technique
2. First Embodiment (an example to which a resonant frequency variation technique is applied)
3. Second Embodiment (an example to which an oscillation frequency variation technique is applied)
4. Third Embodiment (an example to which a transmission power variation technique is applied)

1. Basic Power Transmission Technique

Figure 1:
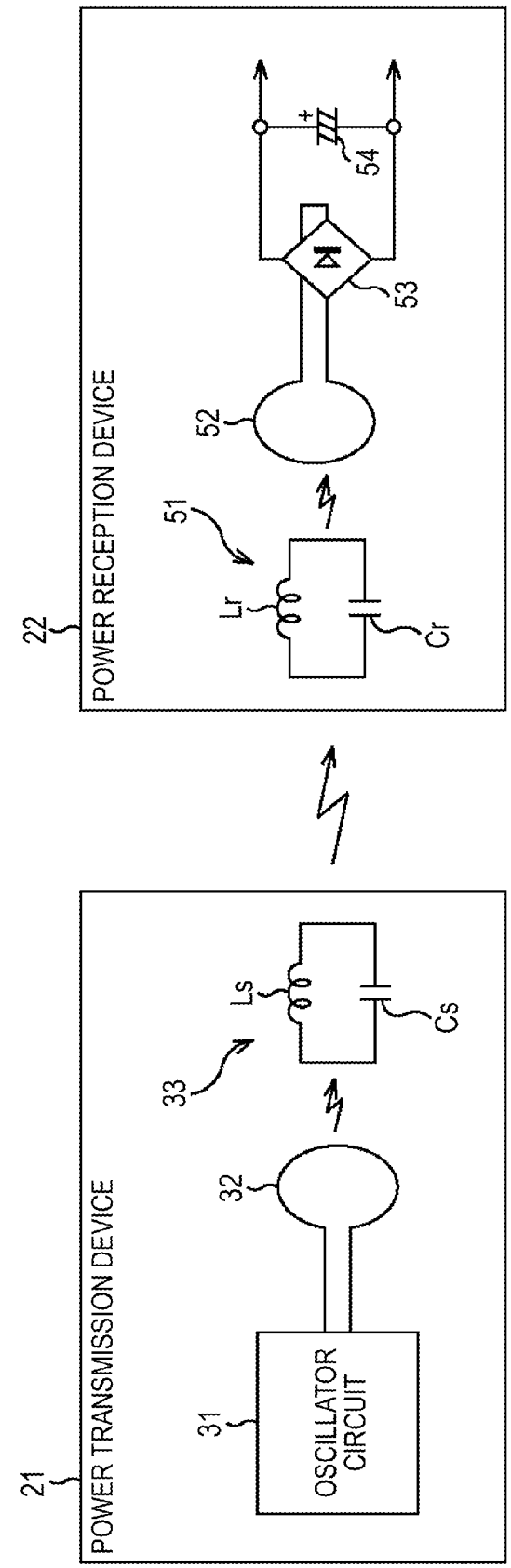
FIG. 1 is a block diagram representing a configuration example of a basic power transmission system.

Configuration Example of Power Transmission System to which Basic Power Transmission Technique is Applied FIG. 1 represents a configuration example of a power transmission system (hereinafter, referred to as a basic power transmission system) to which a basic power transmission technique is applied.

The basic power transmission system 11 is configured by a transmission device 21 and a power reception device 22.

The power transmission device 21 is configured by an oscillator circuit 31, a power transmission coil 32, and a transmission-side resonant circuit 33.

To the oscillator circuit 31, the power transmission coil 32, for example, of about one loop is connected. Near the oscillator circuit 31 and the power transmission coil 32, the transmission-side resonant circuit 33 that is configured, for example, by a coil of about several loops is disposed.

In addition, the power reception device 22 is configured by a reception-side resonant circuit 51, a power reception coil 52, a bridge rectifier circuit 53, and a smoothing capacitor 54.

The reception-side resonant circuit 51, similarly to the transmission-side resonant circuit 33, is configured by a coil, for example, of several loops. Near the reception-side resonant circuit 51, the power reception coil 52 is disposed. The power-reception coil 52 is configured by a coil, for example, of about one loop.

To the power reception coil 52, the bridge rectifier circuit 53 is connected. The frequency of an alternating current flowing through the bridge rectifier circuit 53 is relatively high. Thus, as the bridge rectifier circuit 53, preferably, a fast recovery diode or the like may be used.

To the output ends of the bridge rectifier circuit 53, the smoothing capacitor 54 is connected. The smoothing capacitor 54, for example, is configured by an electrolytic capacitor.

The operation of the basic power transmission system 11 having the above-described configuration is as follows.

In other words, when starting an oscillation operation, the oscillator circuit 31 of the power transmission device 21 outputs an alternating current of a predetermined frequency f31 (hereinafter, referred to as an oscillation frequency f31). Then, the alternating current output from the oscillator circuit 31 flows through the power transmission coil 32, thereby a vibrating electromagnetic field having the oscillation frequency f31 is generated on the periphery of the power transmission coil 32.

In the transmission-side resonant circuit 33, an alternating current that is induced by the vibrating electromagnetic field of the power transmission coil 32 flows. As a result, a vibrating electric field having a resonant frequency f33, which is represented in the following Equation (1), is generated on the periphery of the transmission-side resonant circuit 33.

In other words, an equivalent circuit of the transmission-side resonant circuit 33, as represented in FIG. 1, is an LC circuit that is configured by inductance of Ls and stray capacitance of Cs of a coil. In such a case, the resonant frequency f33 of the transmission-side resonant circuit 33 is represented as the following Equation (1).

$$f_{33} = \frac{1}{2\pi\sqrt{LsCs}} \qquad \text{Equation (1)}$$

Through the reception-side resonant circuit 51, an alternating current that is induced by the vibrating electromagnetic field of the transmission-side resonant circuit 33 flows. As a result, a vibrating electric field having a resonant frequency f51, which is represented in the following Equation (2), is generated on the periphery of the reception-side resonant circuit 51.

In other words, an equivalent circuit of the reception-side resonant circuit 51, as represented in FIG. 1, is an LC circuit that is configured by inductance of Lr and stray capacitance of Cr of a coil. In such a case, the resonant frequency f51 of the reception-side resonant circuit 51 is represented as the following Equation (2).

$$f_{51} = \frac{1}{2\pi\sqrt{LrCr}} \qquad \text{Equation (2)}$$

In addition, ideally, each of the resonant frequency f33 of the transmission-side resonant circuit 33 and the resonant frequency f51 of the reception-side resonant circuit 51 is the same as the oscillation frequency f31. Here, the reason for describing as "ideally" is that there are cases where the resonant frequencies f33 and f51 are different from the oscillation frequency f31 in actual use. However, detailed description thereof will be followed later in a section entitled "Transmission Efficiency of Basic Power Transmission Technique".

An alternating current induced by a vibrating electromagnetic field of the reception-side resonant circuit 51 flows from the power reception coil 52 to the bridge rectifier circuit 53. Then, full-wave rectification is performed for this alternating current by the bridge rectifier circuit 53. The full-wave rectified current (ripple current) is converted into a direct current by the smoothing capacitor 54 and is supplied to a circuit of a latter stage not shown in the figure.

As described above, in the basic power transmission system 11, power is supplied from the power transmission device 21 to the power reception device 22 in a non-contacting manner.

Transmission Efficiency of Basic Power Transmission Technique

According to the basic power transmission technique, it is difficult to raise the transmission efficiency without raising the Q value of the resonant circuit. In other words, in the example represented in FIG. 1, the Q values of the transmission-side resonant circuit 33 and the reception-side resonant circuit 51 may need to be raised.

In addition, in the frequency range used for the basic power transmission technique, the Q value of the resonant circuit depends on the characteristics of the coil. Accordingly, the Q value is represented as Equation (3).

$$Q = \omega\frac{L}{R} \qquad \text{Equation (3)}$$

In Equation (3), ω represents the angular frequency, L represents the value of inductance of the coil of the resonant circuit, and R represents the value of resistance of the resonant circuit. In other words, as ω and L, the parameters represented in the above-described Equation (1) are used for the transmission-side resonant circuit 33, and the parameters represented in the above-described Equation (2) are used for the reception-side resonant circuit 51.

However, generally, the resonant frequencies f33 and f51 of the resonant circuits 33 and 51 having high Q values can be easily influenced by metal or a person located on the periphery thereof, temperature, humidity, or the like.

In addition, as described above, ideally, the resonant circuits 33 and 51 are designed such that the resonant frequencies f33 and f51 coincide with the oscillation frequency f31. However, it may be difficult to manufacture the resonant circuits 33 and 51 of which the resonant frequencies f33 and f51 coincide with the oscillation frequency f31 at high precision in a high volume.

As described above, there are cases where the resonant frequencies f33 and f51 of the resonant circuits 33 and 51 in the middle of use are different from the oscillation frequency f31. In such a case, the transmission efficiency deteriorates. Such a case will be described in detail with reference to FIG. 2.

Figure 2:
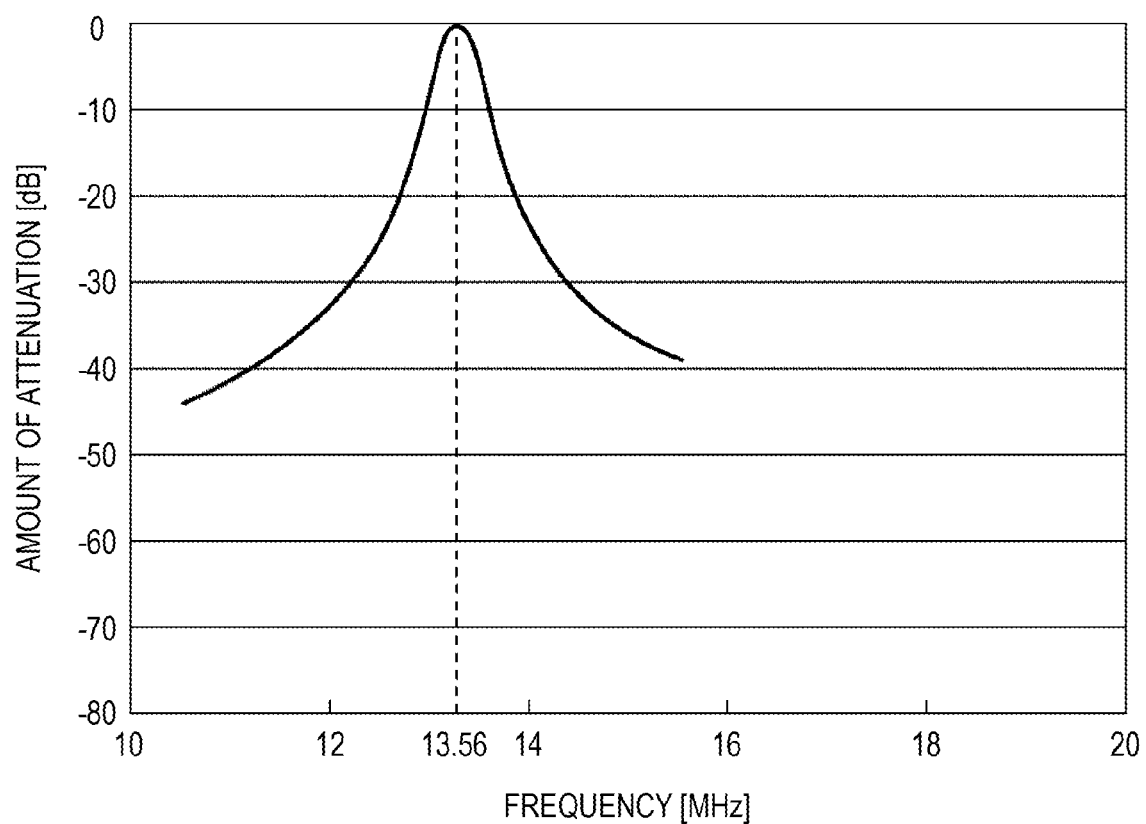
FIG. 2 is a diagram illustrating an example of a change in the transmission efficiency of the basic power transmission system shown in FIG. 1.

FIG. 2 is a diagram illustrating an example of a change in the transmission efficiency of the basic power transmission system 11.

In FIG. 2, the vertical axis represents an attenuation amount [dB] with respect to a maximum transmission efficiency as the transmission efficiency, and the horizontal axis represents the oscillation frequency f31 [MHz].

In the example illustrated in FIG. 2, the resonant frequencies f33 and f51 are fixed to 13.56 MHz that is an ISM (Industry Science Medical) band. In a trial production experiment, both the Q values of the resonant circuits 33 and 51 were about 400. In other words, both the Q values are set to abnormally high values.

As illustrated in FIG. 2, it can be noticed that the transmission efficiency decreases by a great amount of about 20 dB as the oscillation frequency f31 is deviated from the resonant frequencies f33 and f51 (=13.56 MHz) by the small amount of 0.5 MHz. In an opposite point of view, when the resonant frequencies f33 and f51 are slightly changed as metal, a person, or the like is brought to be close to the resonant circuits in a case where the oscillation frequency f31 is fixed, the transmission efficiency decreases by a great amount. The great decrease in the transmission efficiency indicates that it is difficult to perform power transmission.

2. First Embodiment

The inventor of the present invention invents a technique for changing the resonant frequency based on the basic power transmission technique. Here, such a technique is referred to as a resonant frequency variation technique. Among power transmission systems to which embodiments of the present invention are applied, an embodiment to which such a resonant frequency variation technique is applied is a first embodiment.

In other words, the resonant frequency variation technique is applied to the first embodiment, so that the resonant frequency is controlled to coincide with the oscillation frequency even in the middle of use of the power transmission system. As a result, a decrease in the transmission efficiency can be prevented. In other words, the power can be stably transmitted in a non-contact manner.

Hereinafter, the first embodiment will be further described in detail.

Figure 3:
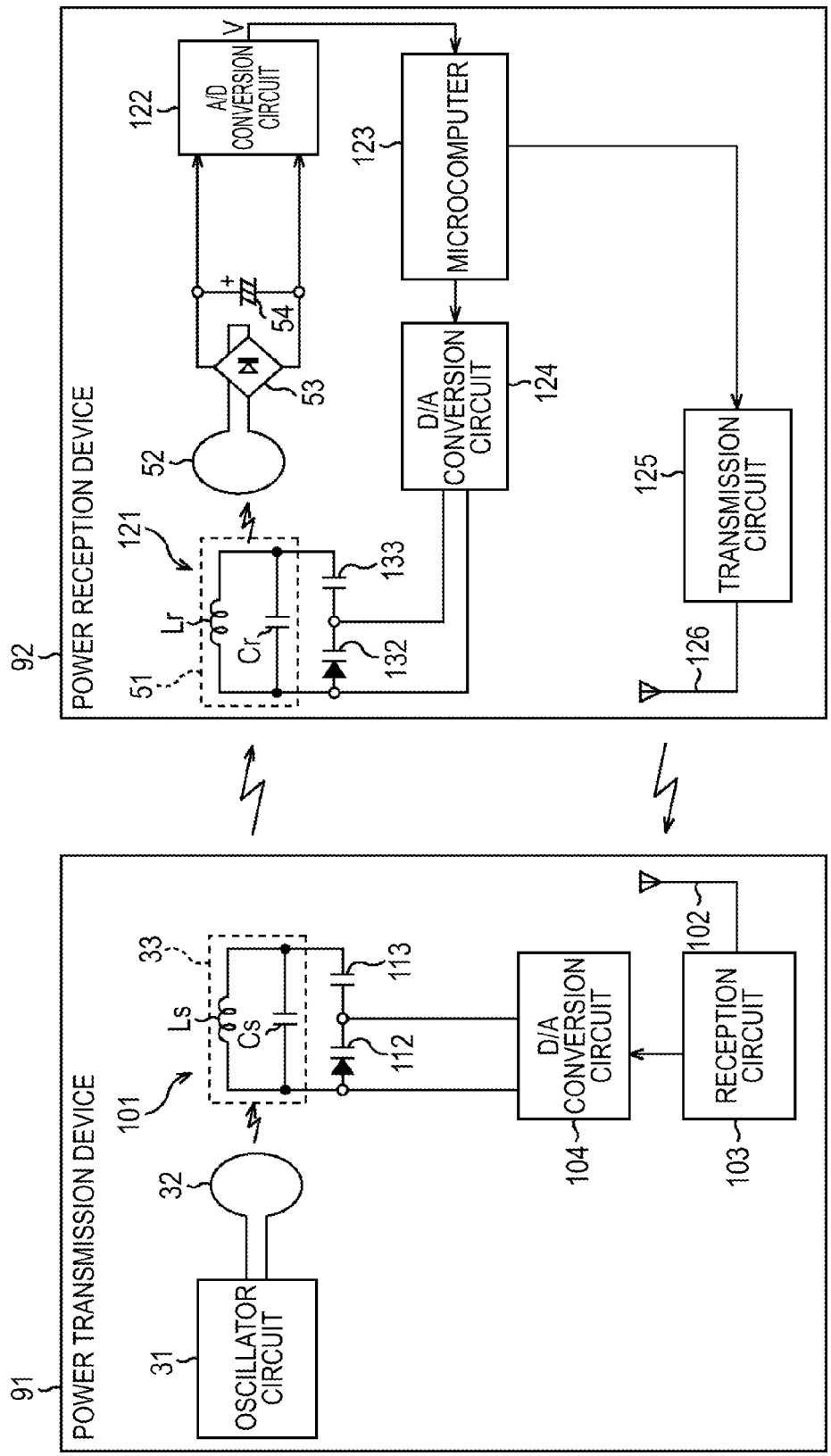
FIG. 3 is a block diagram representing a configuration example of a power transmission system according to a first embodiment of the present invention.

Configuration Example of Power Transmission System According to First Embodiment FIG. 3 represents a configuration example of a power transmission system according to the first embodiment of the present invention.

In FIG. 3, a same reference sign is assigned to each portion corresponding to that in FIG. 1, and description thereof is appropriately omitted.

The power transmission system 81 of the example represented in FIG. 3 is configured to include a power transmission device 91 and a power reception device 92.

In the power transmission device 91, similarly to the case represented in FIG. 1, an oscillator circuit 31 and a power transmission coil 32 are disposed. In addition, in the power transmission device 91, instead of the transmission-side resonant circuit 33 represented in FIG. 1, a transmission-side resonant circuit 101 is disposed.

In the transmission-side resonant circuit 101, a serial circuit that is formed by a variable capacitance diode 112 and a capacitor 113 is connected to be in parallel with the transmission-side resonant circuit 33 (a coil of several loops) represented in FIG. 1.

Here, when the capacitance value of the variable capacitance diode 112 is denoted by Cvs, and the capacitance value of the capacitor 113 is denoted by Ccs, the resonant frequency f101 of the transmission-side resonant circuit 101 is represented as the following Equation (4).

$$f_{101} = \frac{1}{2\pi\sqrt{Ls\left(Cs + \frac{Cvs + Ccs}{CvsCcs}\right)}} \quad \text{Equation (4)}$$

In Equation (4), while the capacitance value Ccs of the capacitor 113 is a predetermined fixed value, the capacitance value Cvs of the variable capacitance diode 112 is a variable value. The variable capacitance diode 112 is an element that is also referred to as a varactor, a varicap diode, or the like. The reason for this is that the variable capacitance diode 112 has a characteristic that the capacitance value Cvs decreases as an applied voltage is increased.

In other words, by changing the voltage applied to the variable capacitance diode 112, the capacitance value Cvs thereof is changed. Accordingly, the resonant frequency f101 of the transmission-side resonant circuit 101 can be changed. Thus, by changing the resonant frequency f101 of the transmission-side resonant circuit 101 so as to coincide with the oscillation frequency f33, a decrease in the transmission efficiency can be prevented. In other words, the power can be stably transmitted in a non-contacting manner.

In other words, in order to change the resonant frequency f101 of the transmission-side resonant circuit 101 to coincide with the oscillation frequency f33, it is preferable to perform appropriate control of the capacitance value Cvs of the variable capacitance diode 112, that is, to perform appropriate control of the voltage applied to the variable capacitance diode 112. In order to implement such control (hereinafter, referred to as transmission-side resonant frequency variance control), an antenna 102, a reception circuit 103, and a D/A (Digital to Analog) conversion circuit 104 are disposed further in the power transmission device 91.

The reception circuit 103 receives control data, which is transmitted from the power reception device 92, through the antenna 102. In the control data, a command for changing the voltage applied to the variable capacitance diode 112, or the like is included, which will be described in detail later.

Then, the reception circuit 103 generates a direction (digital data) for applying a voltage to the variable capacitance diode 112 based on the control data and supplies the generated direction to the D/A conversion circuit 104. The D/A conversion circuit 104 changes the voltage to be applied to the variable capacitance diode 112 in accordance with the direction supplied from the reception circuit 103. In other words, the D/A conversion circuit 104 applies an analog voltage corresponding to the digital data (direction) supplied from the reception circuit 103 to the variable capacitance diode 112.

Accordingly, the capacitance value Cvs of the variable capacitance diode 112 is changed, and thereby the resonant frequency f101 of transmission-side resonant circuit 101 changes.

As described above, the transmission-side resonant frequency variation control is performed based on the control data that is transmitted from the power reception device 92. The transmission-side resonant frequency variation control will be described later in detail with reference to FIG. 5.

For the above-described transmission device 91, similarly to the case of FIG. 1, a power reception coil 52, a bridge rectifier circuit 53, and a smoothing capacitor 54 are disposed in the power reception device 92. In addition, in the power reception device 92, instead of the reception-side resonant circuit 51 represented in FIG. 1, a reception-side resonant circuit 121 is disposed on the former stage.

In the reception-side resonant circuit 121, a serial circuit that is configured by a variable capacitance diode 132 and a capacitor 133 is connected to be in parallel with the reception-side resonant circuit 51 (a coil of several loops) represented in FIG. 1.

Here, when the capacitance value of the variable capacitance diode 132 is denoted by Cvr, and the capacitance value of the capacitor 133 is denoted by Ccr, the resonant frequency f121 of the reception-side resonant circuit 121 is represented as the following Equation (5).

$$f_{121} = \frac{1}{2\pi\sqrt{Lr\left(Cr + \frac{Cvr + Ccr}{CvrCcr}\right)}} \quad \text{Equation (5)}$$

In Equation (5), for the same reason as is described for the above-described Equation (4), while the capacitance value Ccr of the capacitor 133 is a predetermined fixed value, the capacitance value Cvr of the variable capacitance diode 132 is a variable value. The variable capacitance diode 132 is an element that is also referred to as a varactor, a variable capacitance diode, or the like. The reason for this is that the variable capacitance diode 132 has a characteristic that the capacitance value Cvr decreases as an applied voltage is increased.

In other words, by changing the voltage applied to the variable capacitance diode 132, the capacitance value Cvr thereof is changed. Accordingly, the resonant frequency f121 of the reception-side resonant circuit 121 can be changed. Thus, by changing the resonant frequency f121 of the reception-side resonant circuit 121 so as to coincide with the oscillation frequency f33, a decrease in the transmission efficiency can be prevented. In other words, the power can be stably transmitted in a non-contacting manner.

In other words, in order to change the resonant frequency f121 of the reception-side resonant circuit 121 to coincide with the oscillation frequency f33, it is preferable to perform appropriate control of the capacitance value Cvr of the variable capacitance diode 132, that is, appropriate control of the voltage applied to the variable capacitance diode 132. In order to implement such control (hereinafter, referred to as reception-side resonant frequency variance control), an A/D conversion circuit 122, a microcomputer 123, and a D/A conversion circuit 124 are disposed further in the power reception device 92.

The A/D conversion circuit 122 converts the analog voltage applied across the smoothing capacitor 54 into an output voltage value V that is digital data and supplies the output voltage value V to the microcomputer 123.

The microcomputer 123 controls the overall operation of the power reception device 92.

For example, the microcomputer 123 generates a direction (digital data) for applying a voltage to the reception-side variable capacitance diode 132 based on the output voltage value V of the A/D conversion circuit 12 and supplies the generated direction to the D/A conversion circuit 124.

The D/A conversion circuit 124 changes the voltage to be applied to the variable capacitance diode 132 in accordance with the direction supplied from the microcomputer 123. In other words, the D/A conversion circuit 124 applies an analog voltage corresponding to the digital data (direction) supplied from the microcomputer 123 to the variable capacitance diode 132.

Accordingly, the capacitance value Cvr of the variable capacitance diode 132 is changed, and thereby the resonant frequency f121 of reception-side resonant circuit 121 changes.

As described above, the reception-side resonant frequency variation control is performed based on the output voltage value V of the A/D conversion circuit 12. The reception-side resonant frequency variation control will be described later in detail with reference to FIG. 4.

In addition, for example, the microcomputer 123 generates control data including a command for changing the voltage applied to the transmission-side variable capacitance diode 112 based on the output voltage value V of the A/D conversion circuit 12.

The control data, as described above, is used for the transmission-side resonant frequency variation control. Accordingly, the control data may need to be transmitted to the power transmission device 91. Thus, in the power reception device 92, a transmission circuit 125 and an antenna 126 are further disposed.

In other words, the control data that is generated by the microcomputer 123 is supplied to the transmission circuit 125. Then, the transmission circuit 125 transmits the control data supplied from the microcomputer 123 to the power transmission device 91 through the antenna 126. Thereafter, as described above, the power transmission device 91 changes the voltage applied to the transmission-side variable capacitance diode 112 by using the control data. Accordingly, the capacitance value Cvs is changed, and thereby the resonant frequency f101 of the transmission-side resonant circuit 101 changes. As described above, the transmission-side resonant frequency variation control is performed. The transmission-side resonant frequency variation control will be described later in detail with reference to FIG. 4.

Operation Example of Power Transmission System According to First Embodiment

Next, an operation example of the power transmission system 81 of the example represented in FIG. 3 will be described.

In the operation of the power transmission system 81, the operation of power transmission from the power transmission device 91 to the power reception device 92 is basically the same as that of the basic power transmission system 11 represented in FIG. 1. Thus, description thereof is omitted here.

Hereinafter, in the operation of the power transmission system 81, a process (hereinafter, referred to as a resonant frequency control process) for implementing the reception-side resonant frequency variation control and the transmission-side resonant frequency variation control will be described.

Hereinafter, the power supplied from the power transmission device 91 to the power reception device 92 is referred to as reception power. When the reception power is denoted by P, the reception power P is represented by the following Equation (6).

$$P = \frac{V^2}{R} \qquad \text{Equation (6)}$$

In Equation (6), R represents the resistance value of the load of the power reception device 92.

Here, the transmission-side resonant frequency variation control and the reception-side resonant frequency variation control are control processes for changing the resonant frequencies f101 and f121 so as to coincide with the oscillation frequency f33. As described with reference to FIG. 2, the transmission efficiency is the highest when the resonant frequencies f101 and f121 coincide with the oscillation frequency f33, and thereby the reception power P becomes the maximum. In other words, it is preferable that control for changing the resonant frequencies f101 and f121 so as to maximize the reception power P is employed as the transmission-side resonant frequency variation control and the reception-side resonant frequency variation control. Described in more detail, as represented in Equation (6), in the case of a fixed load, the resistance value R of the load is constant. Accordingly, the reception power P is in proportion to the square of the output voltage value V. As a result, it is preferable that control for changing the resonant frequencies f101 and f121 so as to maximize the output voltage value V is employed as the reception-side resonant frequency variation control. An example of the resonant frequency control process that implements the reception-side resonant frequency variation control and the transmission-side resonant frequency control is represented in FIG. 4.

Figure 4:
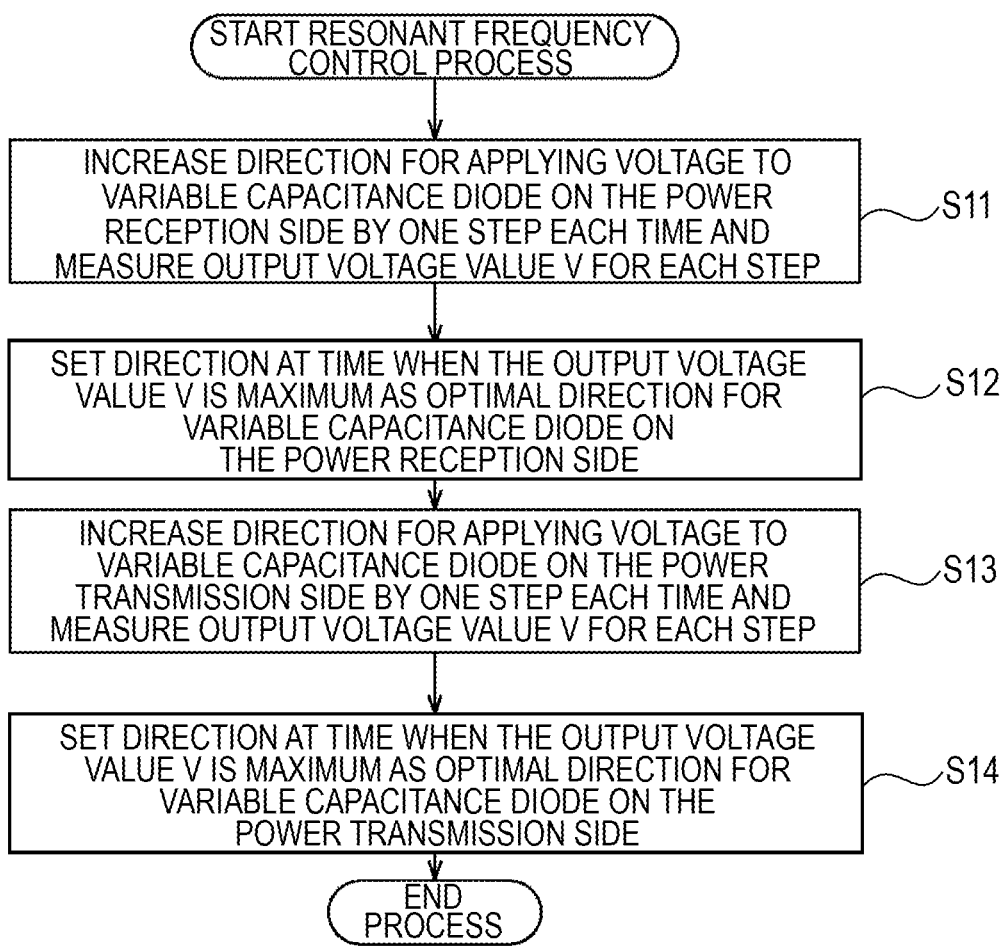
FIG. 4 is a flowchart illustrating an example of a resonant frequency control process for the power transmission system represented in FIG. 3.

FIG. 4 is a flowchart illustrating an example of the resonant frequency control process.

In Step S11, the microcomputer 123 increases the direction for applying the voltage applied to the variable capacitance diode 132 disposed on the reception side by one step each time and measures the output voltage value V for each step.

In Step S12, the microcomputer 123 sets the direction for which the output voltage value V becomes the maximum as an optimal direction for the variable capacitance diode 132 disposed on the reception side.

Thereafter, the microcomputer 123 continues to output the optimal direction (digital data) to the D/A conversion circuit 124. Accordingly, the resonant frequency f121 of the reception-side resonant circuit 121 becomes the frequency for which the output voltage value V becomes the maximum, that is, a frequency that almost coincides with the oscillation frequency f33.

In particular, for example, when the voltage applied to the variable capacitance diode 132 is increased, as described above, the capacitance value Cvr of the variable capacitance diode 132 is decreased, and thereby the resonant frequency f121 of the reception-side resonant circuit 121 increases as represented in the above-described Equation (5). In contrast, when the voltage applied to the variable capacitance diode 132 is decreased, as described above, the capacitance value Cvr of the variable capacitance diode 132 is increased, and thereby the resonant frequency f121 of the reception side resonant circuit 121 decreases as represented in the above-described Equation (5).

Accordingly, in order to allow the resonant frequency f121 of the reception-side resonant circuit 121 to roughly coincide with the oscillation frequency f33, the resonant frequency f121 may need to be adjustable to the higher side or the lower side. In other words, the capacitance value Cvr of the variable capacitance diode 132 may need to be adjustable in the direction for increase or the direction for decrease, so that the capacitance value Cvr of the variable capacitance diode 132, for which the reception power P becomes the maximum, is within the variable range even in a case where metal, a person, or the like is brought to be close to the resonant circuit. Described in more detail, there is non-uniformity in the characteristics of the variable capacitance diode 132, and accordingly, the capacitance value Cvr of the variable capacitance diode 132 may need to be adjustable in consideration of such non-uniformity.

In order to allow such control, preferably the resonant frequency f121 for the ideal state, in which metal, a person, or the like is not brought to be close to the resonant circuit, is the target frequency (oscillation frequency f33) when the capacitance value Cvr of the variable capacitance diode 132 is a median capacitance value of the variable range. For example, in this embodiment, in order to adjust the resonant frequency in such a manner, the inductance Lr of the coil and the capacitance Ccr of the capacitor 133 of the reception-side resonant circuit 121 are adjusted.

Accordingly, for example, in this embodiment, in the process of Step S11, when the direction for applying a voltage to the variable capacitance diode 132 disposed on the reception-side is increased by one step each time, in a step before reaching the direction for the highest step, the output voltage value V becomes the maximum. For example, in an ideal state in which metal, a person, or the like is not brought to be close to the resonant circuit, the output voltage value V becomes the maximum in an almost median step of the variable range of the direction for applying a voltage to the variable capacitance diode 132 disposed on the power reception side. In addition, for example, in a case where metal, a person, or the like is brought to be close to the resonant circuit, in a step slightly deviated from the median step, the output voltage value V becomes the maximum.

Figure 5:
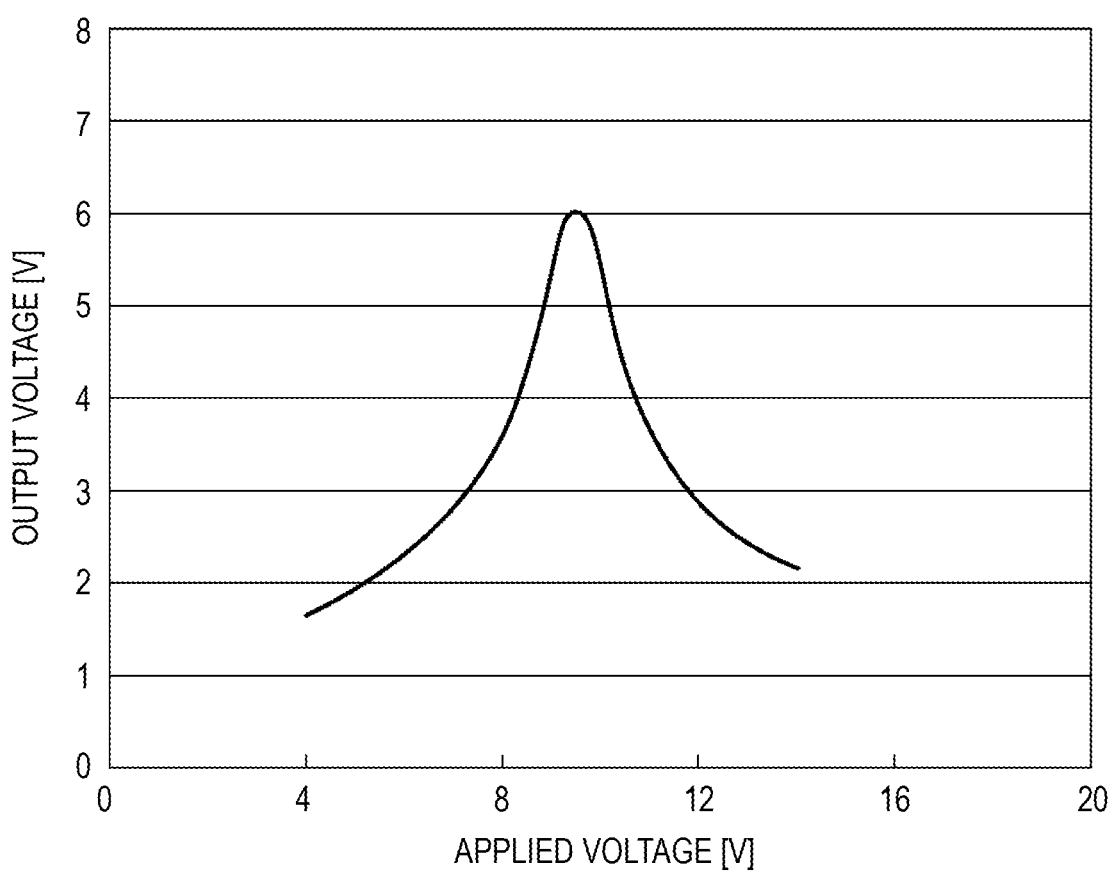
FIG. 5 represents the relationship between a voltage applied to a variable capacitance diode disposed on the reception side and an output voltage value on the reception side of the power transmission system represented in FIG. 3.

For example, FIG. 5 represents the relationship between the voltage applied to the variable capacitance diode 132 disposed on the reception side and the output voltage value V.

In FIG. 5, the vertical axis represents the output voltage value V. In addition, the horizontal axis represents the voltage applied to the variable capacitance diode 132 disposed on the reception side.

In the example represented in FIG. 5, the output voltage value V changes so as to form a mountain shape. Thus, it can be noticed that the top of the mountain shape is formed, that is, the output voltage value V becomes the maximum at the voltage, which is applied to the variable capacitance diode 132 disposed on the reception side, of about 10 V.

In the process of Step S12, the direction (digital data) at the time when the output voltage value V is the maximum, that is, a direction for a step around about 10 V in the example represented in FIG. 5 is set as the optimal direction for the variable capacitance diode 132 disposed on the reception side.

As described above, by the processes of Steps S11 and S12, the reception-side resonant frequency variation control is implemented.

Next, by the process of Step S13 and thereafter, the transmission-side resonant frequency variation control is implemented.

In other words, in Step S13, the microcomputer 123 increases the direction for applying a voltage to the variable capacitance diode 112 disposed on the transmission side by one step each time and measures the output voltage value V for each step.

In particular, for example, the microcomputer 123 generates control data that includes a command for changing the direction for applying a voltage applied to the variable capacitance diode 112 disposed on the transmission side by one step or the like and transmits the generated control data to the power transmission device 91 through the transmission circuit 125 and the antenna 126. Then, the power transmission device 91, as described above, increases the voltage applied to the variable capacitance diode 112 disposed on the transmission side by one step in accordance with the control data. Accordingly, the capacitance value Cvs is changed, and the resonant frequency f101 of the transmission-side resonant circuit 101 changes. As a result, the output voltage value V of the power reception device 92 is changed. Then, the microcomputer 123 measures the changed output voltage value V. By performing the process of Step S13, the series of processes described above is performed for each step.

In addition, for the same reason as the transmission-side variable capacitance diode 132, preferably, the resonant frequency f101 for the ideal state, in which metal, a person, or the like is not brought to be close to the resonant circuit, is the target frequency (oscillation frequency f33) when the capacitance value Cvr of the variable capacitance diode 112 is a median capacitance value of the variable range. For example, in this embodiment, in order to adjust the resonant frequency in such a manner, the inductance Ls of the coil and the capacitance Ccs of the capacitor 133 of the transmission-side resonant circuit 101 are adjusted.

In Step S14, the microcomputer 123 sets the direction at the time when the output voltage value V is the maximum as the optimal direction for the variable capacitance diode 112 disposed on the transmission side.

In particular, for example, the microcomputer 123 generates control data that includes a command for setting an optimal direction for the voltage applied to the variable capacitance diode 112 disposed on the transmission side and transmits the generated control data to the power transmission device 91 through the transmission circuit 125 and the antenna 126.

Then, the power transmission device 91 continues to apply an application voltage corresponding to the optimal direction to the variable capacitance diode 112 disposed on the transmission side. Accordingly, the resonant frequency f101 of the transmission-side resonant circuit 101 becomes a frequency that roughly coincides with the frequency for which the output voltage value V becomes the maximum, that is, the oscillation frequency f33.

As described above, in the power transmission system 81 according to the first embodiment, the resonant frequency control process is performed. Accordingly, the resonant frequency is automatically controlled so as to maximize the reception power P. As a result, the power can be supplied from the power transmission device 91 to the power reception device 92 in a stable manner.

This does not change even in a case where the resonant frequencies f101 and f121 are scattered. In other words, in the power transmission system 81 according to the first embodiment, the resonant frequency control process is performed. Accordingly, variations of the resonant frequencies f101 and f121 are allowed. As a result, compared to a non-contact power system to which a general magnetic resonance-type power transmission technique is applied, the power transmission systems 81 according to the first embodiment can be manufactured in a high volume. In other words, in a non-contact power system to which a general magnetic resonance-type power transmission technique is applied, it is difficult to perform the resonant frequency control process, and thus it is difficult to allow of variations in the resonant frequencies. However, it is difficult to suppress the variations, which are generated in the manufacturing process, in the resonant frequencies. As a result, it is difficult to manufacture non-contact power systems to which a general magnetic resonance-type power transmission technique is applied in a high volume. In the power transmission system 81 according to the first embodiment, variations in the resonant frequencies f101 and f121 are allowed, and such difficulty is resolved.

In addition, a start timing for the resonant frequency control process represented in FIG. 4 is not particularly limited. For example, as the start timing, a timing at which the power reception device 92 becomes conductive may be employed. Alternatively, for example, a timing at which the output voltage value V decreases, a timing after the elapse of a predetermined time, a timing directed by a user, or the like can be employed as the start timing.

In addition, in the resonant frequency control process, two control processes of the reception-side resonant frequency variation control process and the transmission-side resonant frequency variation control process are performed. However, of these two control processes, any one may be configured to be performed. For example, in a case where one of the transmission-side resonant circuit 101 and the reception-side resonant circuit 121 is disposed in a remote place to which a person or metal is not brought to be close and is not influenced thereby, only one resonant frequency may be configured to be controlled.

In addition, in the viewpoint of implementing the reception-side resonant frequency variation control and the transmission-side resonant frequency variation control, the used control technique is not limited to the above-described technique. Thus, the control technique may be any technique that can control the resonant frequencies so as to maximize the reception power P.

For example, as the technique (hereinafter, referred to as a resonant frequency variation technique) for changing the resonant frequencies, in the above-described example, a technique of changing the voltages applied to the variable capacitance diodes 112 and 113 is employed. However, the resonant frequency variation technique is not particularly limited to that described in the above-described example. Thus, a technique for changing the inductance L and the capacitance C of the resonant circuit, for example, by using an element other than the variable capacitance diode, that is, a motor-driven varicon (variable resistor) may be employed. Alternatively, for example, a technique for changing the inductance L by changing the take-out or put-in of the core of a coil configuring the resonant circuit or the intervals of the coil or electrically shifting extractions of taps of the coil may be used.

3. Second Embodiment

Furthermore, in the view point of maximizing the transmission efficiency, that is, in the view point of maximizing the reception power P, any control process for allowing the resonant frequencies and the oscillation frequency to coincide with each other may be performed.

In other words, according to the first embodiment, the reception-side resonant frequency variation control and the transmission-side resonant frequency variation control are employed as the control process for allowing the resonant frequencies and the oscillation frequency f31 to coincide with each other by fixing the oscillation frequency and changing the resonant frequencies.

However, in the viewpoint of maximizing the reception power P, a control process that allows the resonant frequencies and the oscillation frequency to coincide with each other by fixing the resonant frequencies and changing the oscillation frequency may be performed. Hereinafter, such a control process is referred to as oscillation frequency variation control.

In other words, the inventor of the present invention invented a technique (hereinafter referred to as an oscillation frequency variation technique) for implementing oscillation frequency variation control in addition to the resonant frequency variation technique as a technique that is based on the basic power transmission technique. Of the power transmission systems to which embodiments of the present invention are applied, an embodiment to which such an oscillation frequency variation technique is applied is a second embodiment.

In other words, to the second embodiment, the oscillation frequency variation technique is applied. Thus, the oscillation frequency f31 is controlled to coincide with the resonant frequency even in the middle of the use of the power transmission system. As a result, a decrease in the transmission efficiency can be prevented. In other words, the power can be stably transmitted in a non-contact manner.

Hereinafter, the second embodiment will be described further in detail.

Configuration Example of Power Transmission System According to Second Embodiment FIG. 6 represents a configuration example of a power transmission system according to the second embodiment of the present invention.

In FIG. 6, a same reference sign is assigned to each portion corresponding to that in FIG. 1 or 3, and description thereof is appropriately omitted.

The power transmission system 161 of the example represented in FIG. 6 is configured to include a power transmission device 171 and a power reception device 172.

In the viewpoint of comparison with FIG. 1, in the power transmission device 171, similarly to the case represented in FIG. 1, a power transmission coil 32 and a transmission-side resonant circuit 33 are disposed. In addition, in the power transmission device 171, instead of the oscillator circuit 31 represented in FIG. 1, an oscillator circuit 181 is disposed. In addition, in the power transmission device 171, an antenna 102 and a reception circuit 103 are further disposed.

In the viewpoint of comparison with FIG. 3, in the power transmission device 171, the oscillator circuit 181 is disposed instead of the oscillator circuit 31 represented in FIG. 3, and the transmission-side resonant circuit 33 same as that represented in FIG. 1 is disposed instead of the transmission-side resonant circuit 101 represented in FIG. 3. In the power transmission device 171, similarly to the case represented in FIG. 3, the power transmission coil 32, the antenna 102, and the reception circuit 103 are disposed. On the other hand, as a constituent element of the power transmission device 171, the D/A conversion circuit 104 that is one constituent element of the power transmission device 91 represented in FIG. 3 is omitted.

In order to allow the oscillation frequency f181 to be varied, the oscillator circuit 181 is configured to include a reference frequency generating circuit 191, a phase synchronization circuit 192, and an amplifier circuit 193.

The reference frequency generating circuit 191 generates an electric signal having a reference frequency and supplies the generated electric signal to the phase synchronization circuit 192. For example, the phase synchronization circuit 192 is configured by a PLL (phase-locked loop) circuit. In the phase synchronization circuit 192, a multiplying factor N (here, N is a numeric value that is equal or greater than one) for the reference frequency is set. In other words, the phase synchronization circuit 192 generates an electric signal having a frequency of N times the reference frequency by performing a predetermined process for the electric signal having the reference frequency and supplies the generated electric signal to the amplifier circuit 193. The amplifier circuit 193 amplifies the output signal of the phase synchronization circuit 192 and outputs the amplified electric signal. The output signal of the amplifier circuit 193 is the output signal of the oscillator circuit 181.

Accordingly, the oscillation frequency f181 of the oscillator circuit 181 is a frequency of N times the reference frequency. In other words, by changing the set value as N of the phase synchronization circuit 192, the oscillation frequency f181 can be changed.

The setting of the value of N of the phase synchronization circuit 192 is performed by the reception circuit 103. In other words, the reception circuit 103 receives control data, which is transmitted from the power reception device 172, through the antenna 102. As will be described later in detail, a command for changing the value of N or the like is included in the control data. The reception circuit 103 changes the setting of the value of N of the phase synchronization circuit 192 based on the control data.

As described above, the oscillation frequency variation control is performed based on the control data that is transmitted from the power reception device 172. In addition, the oscillation frequency variation control will be further described in detail with reference to FIG. 7.

For the power transmission device 171 having the above-described configuration, the configuration of the power reception device 172, in the viewpoint of comparison with FIG. 1, is as follows. In other words, similarly to FIG. 1, a reception-side resonant circuit 51, a power reception coil 52, a bridge rectifier circuit 53, and a smoothing capacitor 54 are disposed in the power reception device 172. In addition, in the power reception device 172, an A/D conversion circuit 122, a microcomputer 123, a D/A conversion circuit 124, a transmission circuit 125, and an antenna 126 are disposed.

In the viewpoint of comparison with FIG. 3, in the power reception device 172, instead of the reception-side resonant circuit 121 represented in FIG. 3, the reception-side resonant circuit 51 that is the same as that represented in FIG. 1 is disposed. As a constituent element of the power reception device 172, the D/A conversion circuit 124 that is one constituent element of the power reception device 92 represented in FIG. 3 is omitted. Other configurations of the power reception device 172 are the same as those represented in FIG. 3.

Operation Example of Power Transmission System According to Second Embodiment

Next, an operation example of the power transmission system 161 of the example represented in FIG. 6 will be described.

Of the operations of the power transmission system 161, the operation for power transmission from the power transmission device 171 to the power reception device 172 is basically the same as that of the basic power transmission system 11 represented in FIG. 1. Thus, description thereof is omitted here.

Hereinafter, in the operation of the power transmission system 161, a process (hereinafter, referred to as an oscillation frequency control process) for implementing the oscillation frequency variation control will be described.

Figure 7:
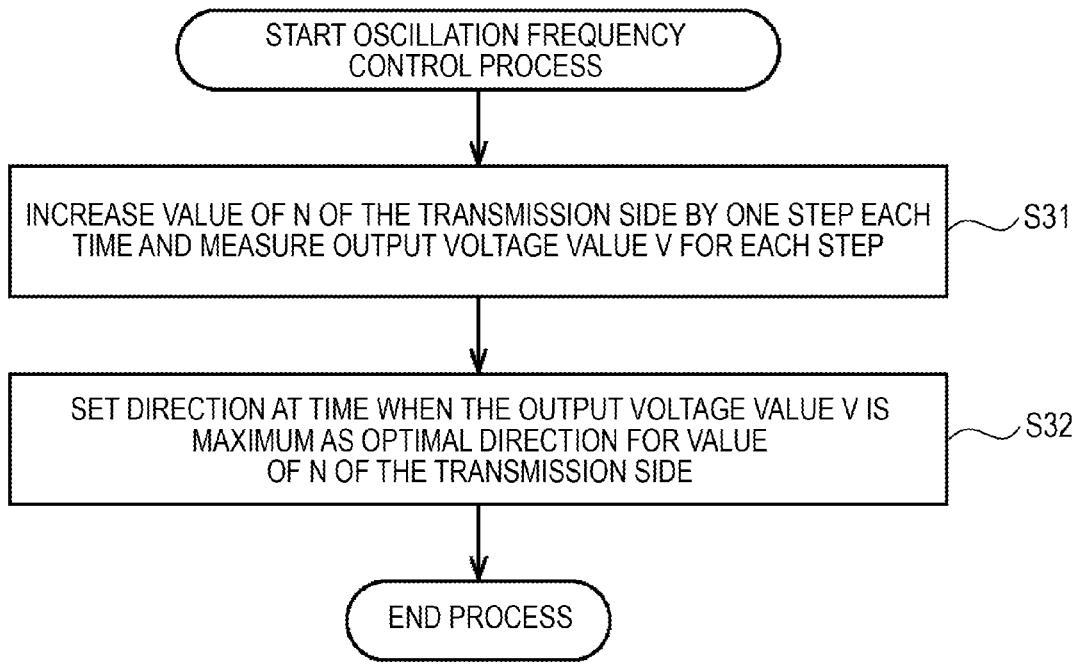
FIG. 7 is a flowchart illustrating an example of an oscillation frequency control process for the power transmission system represented in FIG. 6.

FIG. 7 is a flowchart illustrating an example of the oscillation frequency control process.

In Step S31, the microcomputer 123 increases the value of N on the transmission side by one step each time and measures the output voltage value V for each step.

In particular, for example, the microcomputer 123 generates control data that includes a change command for increasing the value of N on the transmission side by one step or the like and transmits the generated control data to the power transmission device 171 through the transmission circuit 125 and the antenna 126. Then, the power transmission device 171, as described above, increases the value of N of the phase synchronization circuit 192 by one step in accordance with the control data. Accordingly, the oscillation frequency f181 of the oscillator circuit 181 is changed. As a result, the output voltage value V of the power reception device 172 changes. Then, the microcomputer 123 measures the changed output voltage value V. By performing the process of Step S31, the series of processes described above is performed for each step.

In Step S32, the microcomputer 123 sets the direction at the time when the output voltage value V is the maximum as an optimal direction for the value of N on the transmission side.

In particular, for example, the microcomputer 123 generates control data that includes a setting command for the optimal direction for the value of N on the transmission side and transmits the generated the control data to the power transmission device 171 through transmission circuit 125 and the antenna 126.

Then, the power transmission device 171 sets the value of the step corresponding to the optimal direction as the value of N of the phase synchronization circuit 192. Accordingly, the oscillation frequency f181 of the oscillator circuit 181 becomes a frequency for which the output voltage value V is the maximum, that is, a frequency that roughly coincides with the resonant frequency f33 of the transmission-side resonant circuit 33 and the resonant frequency f51 of the reception-side resonant circuit 51.

As described above, in the power transmission system 161 according to the second embodiment, the oscillation frequency control process is performed. Accordingly, the oscillation frequency is automatically controlled so as to maximize the reception power P. As a result, power can be supplied from the power transmission device 171 to the power reception device 172 in a stable manner. In addition, for the same reason as for the first embodiment, the power transmission systems 161 according to the second embodiment can be manufactured in a high volume in an easy manner.

4. Third Embodiment

In the above-described first and second embodiments, a distance (hereinafter, referred to as a transmission distance) between the transmission side and the reception side is fixed. However, for example, when the power reception device is configured by a cellular phone or the like and can be freely carried or the like, there are cases where the transmission distance is changed.

In such a case, the reception power P changes in inverse proportion to the transmission distance. Thus, in a case where any countermeasure is not performed for the case where the transmission distance varies, for example, when the transmission distance is short, the reception power P is equal to or greater than the power (hereinafter, referred to as a necessary power) that may be needed on the reception side. Accordingly, unnecessary radiation is increased, or unnecessary power may be consumed. On the other hand, when the transmission distance is long, the reception power P is less than the necessary power. Accordingly, the operation performed on the reception side may be troubled.

In other words, in a case where the reception power P is preferably maintained at the necessary power, when any countermeasure is not performed for a case where the transmission distance is variable, it is difficult to maintain the reception power P at the necessary power.

In order to maintain the reception power P at the necessary power, the inventor of the present invention invented a technique for controlling the output power (hereinafter, referred to as transmission power) of the power transmission device 91 based on the basic power transmission technique. Hereinafter, such control is referred to as transmission power variation control, and such a technique is referred to as a transmission power variation technique.

Transmission Power Variation Technique

Figure 8:
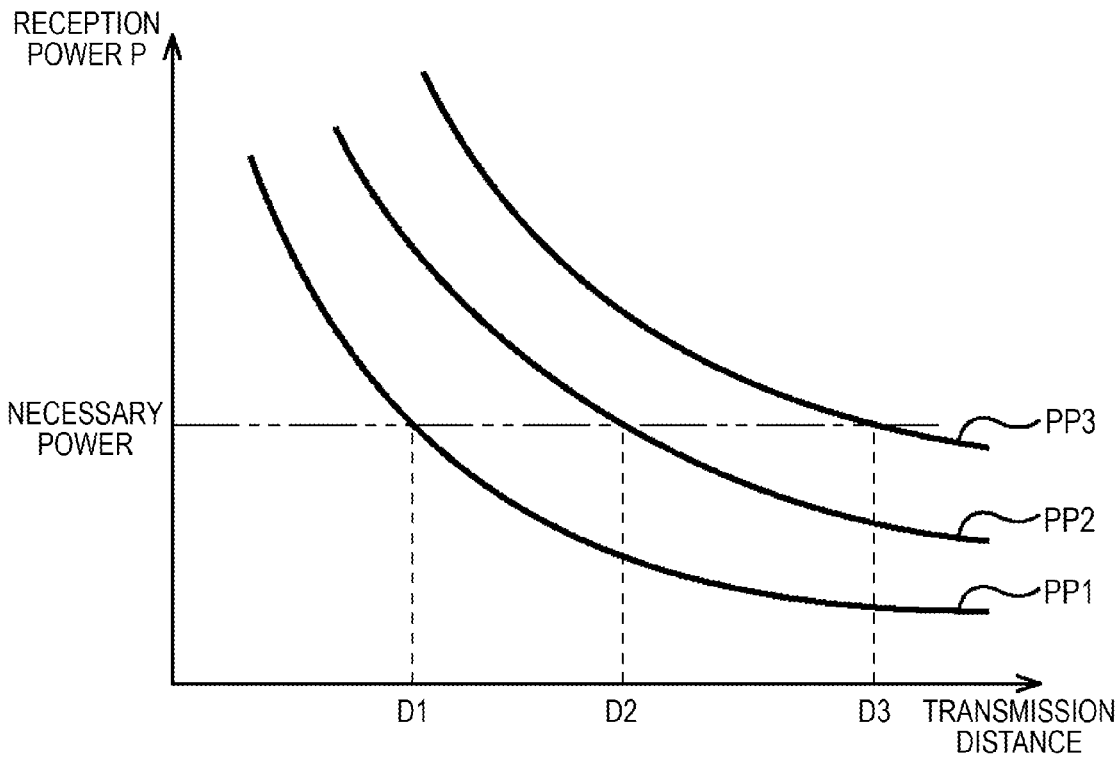
FIG. 8 is a diagram illustrating a transmission power variation technique to which an embodiment of the present invention is applied.

FIG. 8 is a diagram illustrating the transmission power variation technique.

In FIG. 8, the vertical axis represents reception power P, and the horizontal axis represents a transmission distance.

In the example illustrated in FIG. 8, for simplification of the description, it is assumed that the transmission power can be changed to three levels of "low", "middle", and "high". In such a case, a change in the reception power P with respect to the transmission distance for the case where the transmission power is "low" is represented by a curve PP1. In addition, a change in the reception power P with respect to the transmission distance for the case where the transmission power is "middle" is represented by a curve PP2. A change in the reception power P with respect to the transmission distance for the case where transmission power is "high" is represented by a curve PP3.

Now, for example, it is assumed that the transmission distance is a distance D2, and the transmission power is "middle". In such a case, the reception power P is the necessary power. In other words, in a case where the transmission distance is D2, the transmission power is preferably controlled such that the transmission power is "middle".

However, for example, thereafter, in a case where the transmission distance is changed to a relatively short distance D1, when the transmission power is maintained at "middle", the reception power P exceeds the necessary power. In such a case, control is performed such that the transmission power is changed from the "middle" to "low" as the transmission power variation control. As a result, the reception power P can be maintained at the necessary power.

In addition, for example, thereafter, in a case where the transmission distance is changed to a relatively long distance D3, when the transmission power is maintained at "low", the reception power P is lower than the necessary power. In such a case, control is performed such that the transmission power is changed from the "low" to "high" as the transmission power variation control. As a result, the reception power P can be maintained at the necessary power.

Of the power transmission systems to which embodiments of the present invention are applied, an embodiment to which such a transmission power variation technique is applied is the third embodiment.

In other words, the transmission power variation technique is applied to the third embodiment, and the reception power P is controlled to be maintained at the necessary power without depending on the transmission distance. As a result, the power can be stably transmitted in a non-contact manner.

Hereinafter, the third embodiment will be described further in detail.

Figure 9:
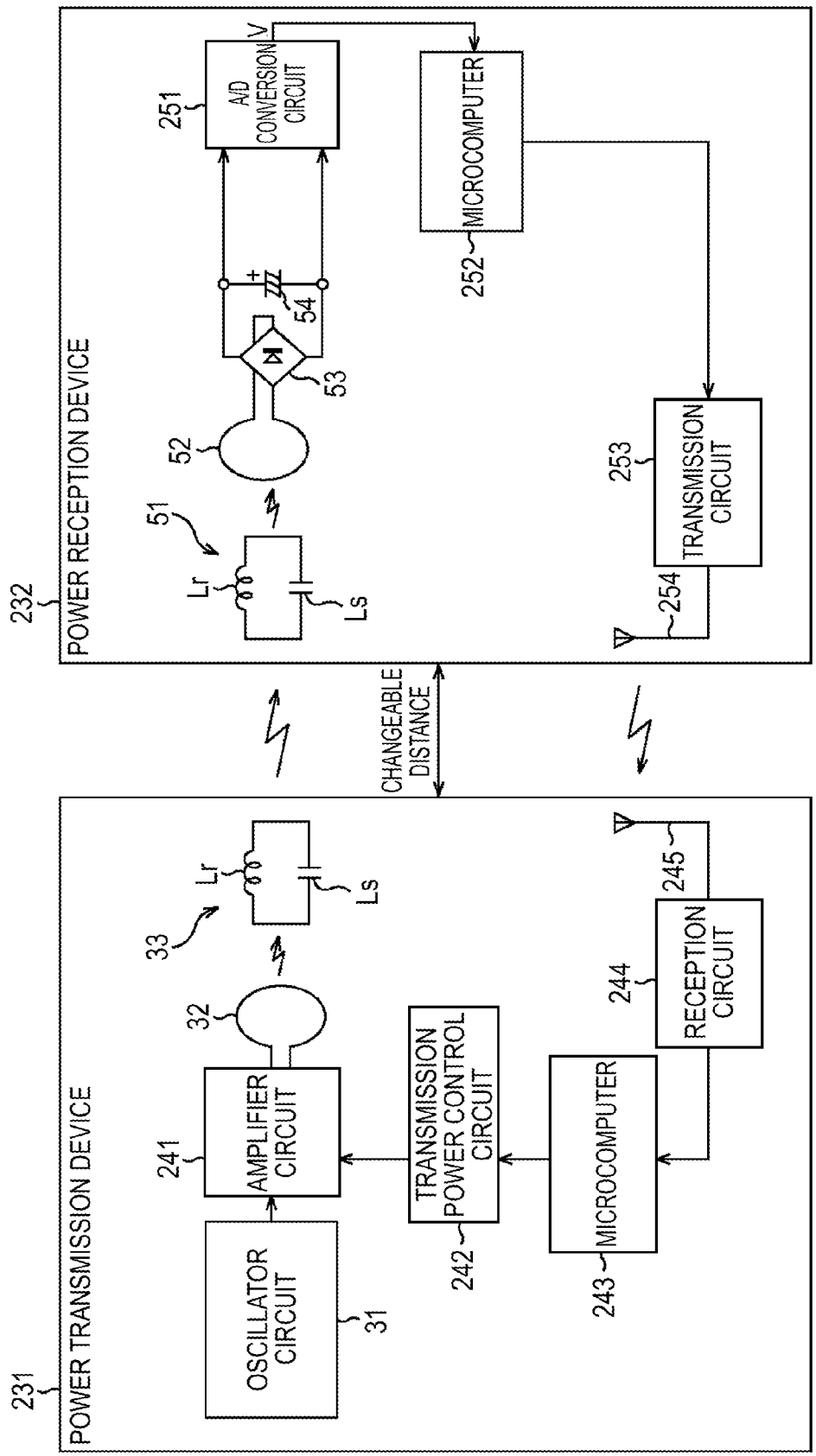
FIG. 9 is a block diagram representing a configuration example of a power transmission system according to a third embodiment of the present invention.

Configuration Example of Power Transmission System According to Third Embodiment FIG. 9 represents a configuration example of a power transmission system according to the third embodiment of the present invention.

In FIG. 9, a same reference sign is assigned to each portion corresponding to that in FIG. 1, and description thereof is appropriately omitted.

The power transmission system 221 of the example represented in FIG. 9 is configured to include a power transmission device 231 and a power reception device 232.

In the power transmission device 231, similarly to the case represented in FIG. 1, an oscillator circuit 31, a power transmission coil 32, and a transmission-side resonant circuit 33 are disposed. In addition, in the power transmission device 231, an amplifier circuit 241 is disposed between the oscillator circuit 31 and the transmission coil 32. Furthermore, in the power transmission device 231, a transmission power control circuit 242, a microcomputer 243, a reception circuit 244, and an antenna 245 are disposed.

In the power reception device 232, similarly to the case of FIG. 1, a reception-side resonant circuit 51, a power reception coil 52, a bridge rectifier circuit 53, and a smoothing capacitor 54 are disposed. In addition, in the power reception device 232, an A/D conversion circuit 251 is disposed on the latter stage. Furthermore, in the power reception device 232, a microcomputer 252, a transmission circuit 253, and an antenna 254 are disposed.

The A/D conversion circuit 251 disposed on the power reception device 232 side converts an analog voltage applied across the smoothing capacitor 54 into an output voltage value V as digital data and supplies the voltage output value V to the microcomputer 123.

The microcomputer 252 disposed on the power reception device 232 side controls the overall operation of the power reception device 232. For example, the microcomputer 252 generates control data that includes a change command for the transmission power or the like based on the output voltage value V of the A/D conversion circuit 251 and supplies the generated control data to the transmission circuit 253.

The transmission circuit 125 disposed on the power reception device 232 side transmits the control data, which is supplied from the microcomputer 252, to the transmission device 231 through the antenna 254.

The reception circuit 244 disposed on the power transmission device 231 side receives the control data, which is transmitted from the power reception device 232, through the antenna 245 and supplies the received control data to the microcomputer 243.

The microcomputer 243 disposed on the power transmission device 231 side controls the overall operation of the power transmission device 231. For example, the microcomputer 243 generates a change command for the transmission power based on the control data and supplies the generated control data to the transmission power control circuit 242.

The transmission power control circuit 242 sets the gain (amplification factor) of the amplifier circuit 241 based on the change command for the transmission power. The amplifier circuit 241 amplifies the output signal of the oscillator circuit 31 by the set gain.

In a case where a value lower than the value before being set is set as the gain, the output signal is "amplified by the set gain" indicates that the level of the output signal of the oscillator circuit 31 is lowered, and the transmission power is lowered by that amount. On the other hand, in a case where a value higher than the value before being set is set as the gain, the output signal is "amplified by the set gain" indicates that the level of the output signal of the oscillator circuit 31 is raised, and the transmission power is raised by that amount. In addition, in a case where a value that is the same as the value before being set is set as the gain (in a case where the set gain is not changed), the output signal is "amplified by the set gain" indicates that the level of the output signal of the oscillator circuit 31 is maintained, and thereby the transmission power is also maintained at the current state.

Operation Example of Power Transmission System According to Third Embodiment

Next, an operation example of the power transmission system 221 of the example represented in FIG. 9 will be described.

In the operation of the power transmission system 221, the operation of power transmission from the power transmission device 231 to the power reception device 232 is basically the same as that of the basic power transmission system 11 represented in FIG. 1. Thus, description thereof is omitted here.

Hereinafter, in the operation of the power transmission system 221, a process (hereinafter, referred to as a transmission power control process) for implementing the transmission power variation control will be described.

Figure 10:
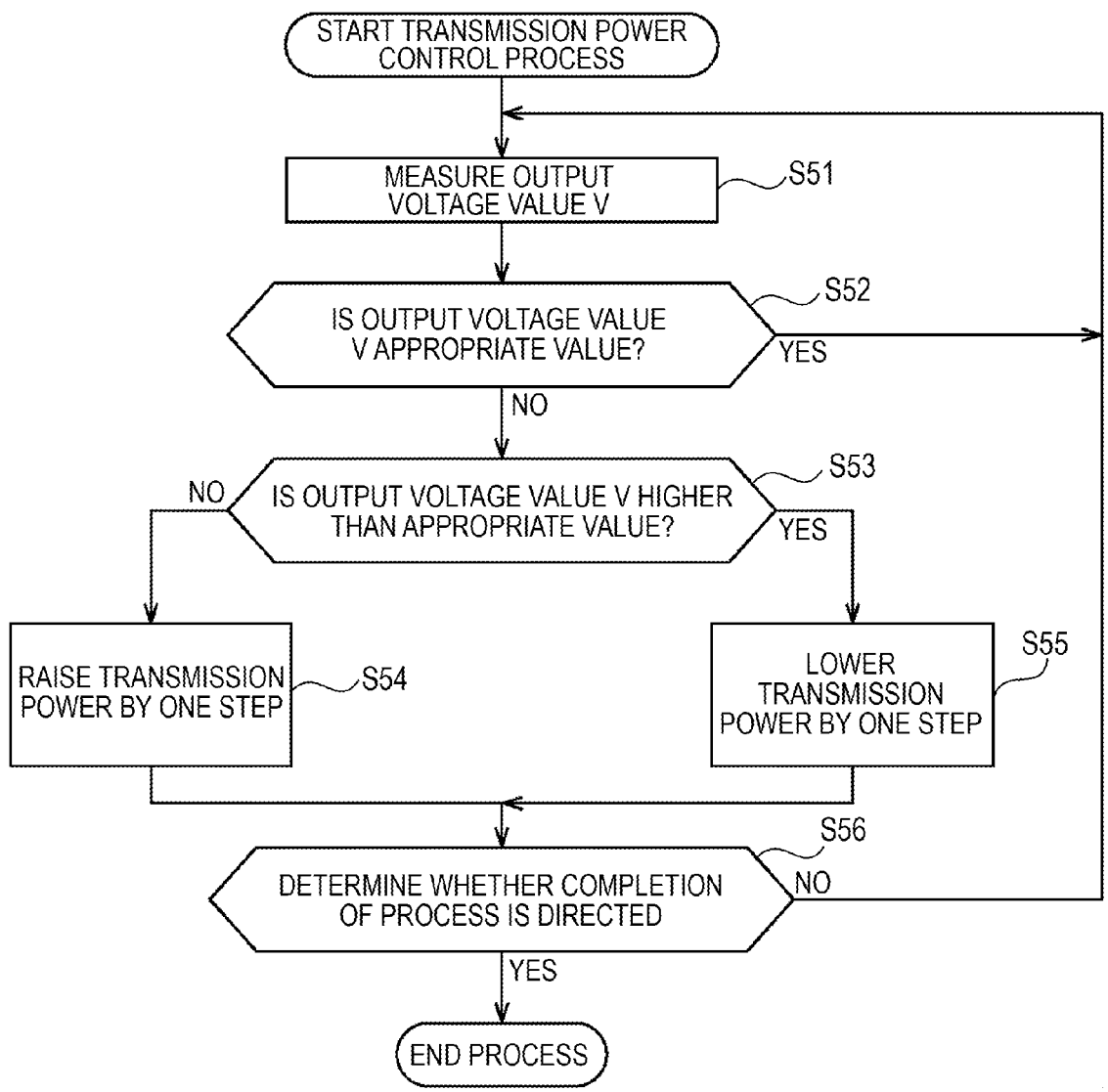
FIG. 10 is a flowchart illustrating an example of a transmission power control process for the power transmission system represented in FIG. 9.

FIG. 10 is a flowchart illustrating an example of the transmission power control process.

In Step S51, the microcomputer 252 measures the output voltage value V.

In Step S52, the microcomputer 252 determines whether the output voltage value Vis an appropriate value (hereinafter, referred to as an appropriate value) corresponding to the necessary power.

In a case where the output voltage value V is the appropriate value, "YES" is determined in Step S52. Then, the process is returned back to Step S51, and the processes thereafter are repeated. In other words, as long as the output voltage value V is the appropriate value, the looping process of Steps S51 and S52 is repeatedly performed. Accordingly, the transmission power is maintained at the current state.

Thereafter, in a case where the output voltage value V is higher or lower than the appropriate value due to a change in the transmission distance or the like, the output voltage value V is determined not to be the appropriate value in Step S52. Then, the process proceeds to Step S53.

In Step S53, the microcomputer 252 determines whether the output voltage value V is higher or lower than the appropriate value.

In a case where the output voltage value V is lower than the appropriate value, "NO" is determined in Step S53. Then, the process proceeds to Step S54. In Step S54, the microcomputer 252 raises the transmission power by one step.

On the other hand, in a case where the output voltage value V is higher than the appropriate value, "YES" is determined in Step S53. Then, the process proceeds to Step S55. In Step S55, the microcomputer 252 lowers the transmission power by one step.

In particular, for example, as the process of Step S54 or S55, a series of processes described below is performed. In other words, the microcomputer 252 generates control data that includes a change command for raising or lowering the transmission power by one step or the like and transmits the generated control data to the transmission device 231 through the transmission circuit 253 and the antenna 254. Then, the transmission device 231, as described above, raises or lowers the transmission power by one step by increasing or decreasing the gain of the amplifier circuit 241 in accordance with the control data.

When such a series of processes is performed as the process of Step S54 or S55, the process proceeds to Step S56.

In Step S56, the microcomputer 252 determines whether completion of the process is directed.

In a case where the completion of the process has not been directed yet, "NO" is determined in Step S56. Then, the process is returned back to Step S51, and the processes thereafter are repeated. In other words, until the completion of the process is directed, the looping process of Steps S51 to S56 is repeatedly performed, and thereby the transmission power variation control is implemented.

Thereafter, when the completion of the process is directed, "YES" is determined in Step S56, and thereby the transmission power control process is completed.

As described above, in the power transmission system 221 according to the third embodiment, the transmission power control process is performed. Accordingly, the transmission power is automatically controlled such that the reception power P has an appropriate value (necessary power). As a result, on the reception side, unnecessary radiation or consumption of unnecessary power can be prevented. In addition, negative influence due to lack of the power can be eliminated.

In addition, when an obstacle is inserted between the power transmission side and the power reception side, and transmission loss occurs, the reception power P is lowered without the transmission distance being changed in a case where the transmission power is fixed. Accordingly, negative influence due to lack of the power may occur. As a countermeasure for such a case as well, it is preferable that the power transmission system 221 according to the third embodiment is used, and the transmission power control process is performed.

Other Applications of Embodiments of Present Invention

The power transmission systems according to the first to third embodiments of the present invention have been described as above. However, the embodiments of the present invention are not particularly limited to the first to third embodiments. Thus, an embodiment of the present invention may be applied to any form of a power transmission system to which the basic power transmission technique is applied.

For example, as an embodiment of the present invention, a power transmission system to which arbitrary two or more of the resonant frequency variation technique, the oscillation frequency variation technique, and the transmission power variation technique are applied in a combining manner may be used.

In addition, for example, in the first to third embodiments, as a technique for transmission and reception of the control data between the power transmission side and the power reception side, a technique that utilizing electric waves is used. However, the transmission and reception technique is not particularly limited. Thus, other than the above-described technique, for example, a technique utilizing infrared rays or the like may used. In other words, as an embodiment of the present invention, a power transmission system to which an arbitrary transmission and reception technique is applied may be used.

Furthermore, the series of processes described above may be performed by hardware or software. In a case where the series of processes is performed by software, a program configuring the software is installed from a program recording medium. This program, for example, is installed to a computer, that is, built-in dedicated hardware. Alternatively, this program may be installed, for example, to a general-purpose personal computer or the like capable of performing various functions by installing various programs thereto.

FIG. 11 is a block diagram representing a configuration example of the hardware of a computer that performs the series of processes described above in accordance with a program.

In the computer, a CPU 301, a ROM (Read Only Memory) 302, and a RAM (Random Access Memory) 303 are interconnected through a bus 304. In addition, an input-output interface 305 is connected to the bus 304. To the input-output interface 305, an input unit 306 that is configured by a keyboard, a mouse, a microphone or the like, an output unit 307 that is configured by a display, a speaker, or the like, and a memory unit 308 that is configured by a hard disk, a non-volatile memory, or the like are connected. In addition, to the input-output interface 305, a communication unit 309 that is configured by a network interface or the like and a drive 310 that drives a removable medium 311 such as a magnetic disk, an optical disc, a magneto-optical disc, or a semiconductor memory are connected.

In the computer configured as described above, the series of processes described above is performed as the CPU 301, for example, loads and a program stored in the memory unit 308 into the RAM 303 through the input-output interface 305 and the bus 304 and executes the loaded program. The program executed by the computer (CPU 301), for example, is provided by being recorded on the removable medium 311 that is a magnetic disk (including a flexible disk). The program is provided by being recorded on the removable medium 311 that is a package medium. As the package medium, an optical disc (a CD-ROM (Compact Disc-Read Only Memory), a DVD (Digital Versatile Disc), or the like), a magneto-optical disc, a semiconductor memory, or the like is used. Alternatively, the program may be provided through a wired or wireless transmission medium such as a local area network, the Internet, or a digital satellite broadcast. The program can be installed into the memory unit 308 through the input-output interface 305 by loading the removable medium 311 into the drive 310. In addition, the program may be received by the communication unit 309 through the wired or wireless transmission medium and be installed in the memory unit 308. Alternatively, the program may be installed into the ROM 302 or the memory unit 308 in advance.

In addition, the program that is executed by the computer may be a program for performing processes in a time series in accordance with the sequence described here, a program that performs the processes in parallel, or a program that performs a process at a necessary timing such as a timing when the program is called.

In descriptions here, the term "system" indicates the overall apparatus that is configured by a plurality of devices, units, or the like.

The embodiments of the present invention are not limited to the above-described embodiments and may be changed in various forms within the scope not departing from the basic concept of the present invention.

The present application contains subject matter related to that disclosed in Japanese Priority Patent Application JP 2009-097661 filed in the Japan Patent Office on Apr. 14, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A power transmission device comprising:
a transmission unit, including at least a transmission-side oscillation section and a transmission-side resonant section, to transmit power to a power reception device comprising a reception-side resonant section by using a magnetic resonance-type power transmission technique in which a frequency resonance is maintained between the transmission-side resonant section and the reception-side resonant section; and
a control unit for controlling a reception power of the power reception device by changing an oscillation frequency of the transmission-side oscillation section so that a resonant frequency of a transmission-side resonant section is substantially equal to the oscillation frequency of the transmission-side oscillation section, the control unit defining a value to which the oscillation frequency is to be changed by applying a multiplier to a predefined reference frequency, the multiplier being defined in a change command received from the power reception device.

2. A power transmission method comprising the step of:
controlling reception power of a power reception device, comprising a reception-side resonant section, by changing an oscillation frequency of a transmission-side oscillation section so that a resonant frequency of a transmission-side resonant section is substantially equal to the oscillation frequency of the transmission-side oscillation section by using a power transmission device, including at least the transmission-side oscillation section and the transmission-side resonant section, that transmits power to the power reception device by using a magnetic resonance-type power transmission technique in which a frequency resonance is maintained between the transmission-side resonant section and the reception-side resonant section, the controlling comprising defining a value to which the oscillation frequency is to be changed by applying a multiplier to a predefined reference frequency, the multiplier being defined in a change command received from the power reception device.

3. A power reception device comprising:
a power reception unit to receive power by using at least a reception-side resonant section in a case where the power is transmitted from a power transmission device, including at least a transmission-side oscillation section and a transmission-side resonant section, that transmits the power by using a magnetic resonance-type power transmission technique in which a frequency resonance is maintained between the transmission-side resonant section and the reception-side resonant section; and
a control unit to control reception power of the power reception device by changing an oscillation frequency of the transmission-side oscillation section so that at least one of a transmission-side resonant frequency of the transmission-side resonant section and a reception-side resonant frequency of the reception-side resonant section is substantially equal to the oscillation frequency of the transmission-side oscillation section, the control unit defining a value to which the oscillation frequency of the transmission-side oscillation section is to be changed by applying a multiplier to a predefined reference frequency.

4. The power reception device according to claim 3, wherein the transmission-side oscillation section of the power transmission device is configured to change the oscillation frequency, and
wherein the control unit performs control for generating a change command for changing the oscillation frequency based at least in part on the measured value of the reception power and transmitting the change command to the power transmission device.

5. A power reception method comprising the step of:
using a power reception device, controlling reception power of a power reception device by changing an oscillation frequency of a transmission-side oscillation section so that at least one of a transmission-side resonant frequency of a transmission-side resonant section and a reception-side resonant frequency of a reception-side resonant section is substantially equal to the oscillation frequency of the transmission-side oscillation section, the controlling comprising defining a value to which the oscillation frequency of the transmission-side oscillation section is to be changed by applying a multiplier to a predefined reference frequency,
wherein:
the power reception device receives power by using at least the reception-side resonant section in a case where the power is transmitted from a power transmission device, including at least the transmission-side oscillation section and the transmission-side resonant section, that transmits the power by using a magnetic resonance-type power transmission technique in which a frequency resonance is maintained between the transmission-side resonant section and the reception-side resonant section.

6. A power transmission system comprising:
a power transmission device, including at least a transmission-side oscillation section and a transmission-side resonant section, to transmit power by using a magnetic resonance-type power transmission technique; and
a power reception device to receive the power transmitted from the power transmission device at least by using a reception-side resonant section;

wherein:

in the magnetic resonance-type power transmission technique, a frequency resonance is maintained between the transmission-side resonant section and the reception-side resonant section; and reception power of the power reception device is controlled by changing an oscillation frequency of the transmission-side oscillation section so that at least one of a transmission-side resonant frequency of the transmission-side resonant section and a reception-side resonant frequency of the reception-side resonant section is substantially equal to the oscillation frequency of the transmission-side oscillation section, the controlling comprising defining a value to which the oscillation frequency of the transmission-side oscillation section is to be changed by applying a multiplier to a predefined reference frequency, the multiplier being defined in a change command received by the power transmission device from the power reception device.

* * * * *